US010732275B2

(12) United States Patent
Oh et al.

(10) Patent No.: US 10,732,275 B2
(45) Date of Patent: Aug. 4, 2020

(54) ERROR COMPENSATION APPARATUS AND METHOD FOR MEASURING DISTANCE IN WIRELESS COMMUNICATION SYSTEM

(71) Applicant: Samsung Electronics Co., Ltd., Suwon-si, Gyeonggi-do (KR)

(72) Inventors: Jong-Ho Oh, Suwon-si (KR); Jae-Hwa Kim, Hwaseong-si (KR); Jung-Min Yoon, Seoul (KR); Sung-Rok Yoon, Seoul (KR); Sang-Hyun Chang, Seoul (KR); Kil-Sik Ha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 15/119,954

(22) PCT Filed: Feb. 16, 2015

(86) PCT No.: PCT/KR2015/001557
§ 371 (c)(1),
(2) Date: Aug. 18, 2016

(87) PCT Pub. No.: WO2015/126125
PCT Pub. Date: Aug. 27, 2015

(65) Prior Publication Data
US 2017/0059701 A1    Mar. 2, 2017

(30) Foreign Application Priority Data
Feb. 21, 2014    (KR) .................... 10-2014-0020419

(51) Int. Cl.
*G01S 13/74*    (2006.01)
*G01S 7/40*    (2006.01)
*G01S 13/76*    (2006.01)

(52) U.S. Cl.
CPC .............. *G01S 13/74* (2013.01); *G01S 7/40* (2013.01); *G01S 13/765* (2013.01)

(58) Field of Classification Search
CPC ........... G01S 13/74; G01S 5/021; G01S 11/02
See application file for complete search history.

(56) References Cited

U.S. PATENT DOCUMENTS

| 4,654,810 A | 3/1987 | Becker et al. |
| 6,453,168 B1 * | 9/2002 | McCrady ................ G01S 5/021 |
| | | 342/457 |

(Continued)

FOREIGN PATENT DOCUMENTS

| CN | 101112112 A | 1/2008 |
| CN | 101198163 A | 6/2008 |

(Continued)

OTHER PUBLICATIONS

Chinese Office Action dated Jan. 29, 2019, issued in the Chinese Application No. 201580011521.X.

(Continued)

*Primary Examiner* — Gregory C. Issing
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A device for measuring a distance, according to one embodiment of the present invention, includes a transceiver configured to transmit, to another device, a signal and receive, from the another device, another signal according to the signal, and a controller configured to determine a first interval based on the signal and the another signal and (Continued)

determine a distance between the device and the another device based on the first interval, a second interval regarding the another device, and a delay regarding an internal circuit of the device.

14 Claims, 23 Drawing Sheets

(56) References Cited

U.S. PATENT DOCUMENTS

| | | | | |
|---|---|---|---|---|
| 6,801,782 | B2* | 10/2004 | McCrady | G01S 5/021 |
| | | | | 375/347 |
| 6,876,326 | B2* | 4/2005 | Martorana | G01S 1/022 |
| | | | | 342/458 |
| 7,366,243 | B1* | 4/2008 | McCrady | G01S 1/20 |
| | | | | 342/357.64 |
| 7,822,424 | B2* | 10/2010 | Markhovsky | G01S 13/74 |
| | | | | 455/456.1 |
| 2002/0118723 | A1 | 8/2002 | McCrady et al. | |
| 2006/0012476 | A1 | 1/2006 | Markhovsky et al. | |
| 2007/0099646 | A1 | 5/2007 | Tanaka et al. | |
| 2008/0146262 | A1 | 6/2008 | Schwoerer et al. | |
| 2009/0270042 | A1 | 10/2009 | Miscopein et al. | |
| 2010/0128637 | A1 | 5/2010 | Aggarwal et al. | |
| 2010/0177681 | A1* | 7/2010 | Sahinoglu | G01S 5/12 |
| | | | | 370/328 |
| 2011/0148710 | A1* | 6/2011 | Smid | G01S 13/84 |
| | | | | 342/394 |
| 2011/0269478 | A1 | 11/2011 | Das et al. | |
| 2011/0292819 | A1 | 12/2011 | Ekbal et al. | |
| 2012/0269170 | A1 | 10/2012 | Chen et al. | |
| 2016/0205501 | A1 | 7/2016 | Lee et al. | |

FOREIGN PATENT DOCUMENTS

| | | |
|---|---|---|
| CN | 102906590 A | 1/2013 |
| EP | 0 098 160 A1 | 1/1984 |
| EP | 0 139 109 A1 | 5/1985 |
| KR | 10-2008-0050981 A | 6/2008 |
| KR | 10-2011-0087602 A | 8/2011 |
| KR | 10-2015-0026090 A | 3/2015 |
| KR | 10-2015-0052753 A | 5/2015 |

OTHER PUBLICATIONS

Chinese Office Action dated Aug. 20, 2019, issued in the Chinese Application No. 201580011521.X.
Indian Office Action dated May 1, 2020, issued in Indian Patent Application No. 201637031946.
Korean Office Action dated May 11, 2020, issued in Korean Patent Application No. 10-2014-0020419.

* cited by examiner

ERROR COMPENSATION APPARATUS AND METHOD FOR MEASURING DISTANCE IN WIRELESS COMMUNICATION SYSTEM

TECHNICAL FIELD

The present invention relates to signal transmission and reception through a wireless device of a wireless communication system.

BACKGROUND ART

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

According to the recent development of wireless communication technologies, signal transmission and reception through a wireless device has increased. Users may receive various services through transmission and reception of various types of data (for example, multimedia data such as dynamic image, music, photo, and document) by transmitting and receiving signals through a wirelessly accessible wireless device such as a smart phone.

DETAILED DESCRIPTION OF THE INVENTION

Technical Problem

Accordingly, embodiments of the present invention provide an apparatus and a method for measuring a range between wireless devices by using signals transmitted and received between the wireless devices in a wireless communication system.

Further, embodiments of the present invention provide an apparatus and a method for measuring a range between wireless devices in high definition by using signals transmitted and received between the wireless devices in a wireless communication system.

Embodiments of the present invention provide an apparatus and a method for rapidly measuring a range between wireless devices by using signals transmitted and received between the wireless devices in a wireless communication system.

Embodiments of the present invention provide an apparatus and a method for providing information on inaccuracy due to an influence of a multi-path channel when a range between wireless devices is measured using signals transmitted and received between the wireless devices in a wireless communication system.

Embodiments of the present invention provide an apparatus and a method for minimizing power consumption when a range between wireless devices is measured using signals transmitted and received between the wireless devices in a wireless communication system.

Embodiments of the present invention provide an apparatus and a method for accurately estimating a range between wireless devices by calibrating an internal circuit delay of the wireless device when the range between the wireless devices is measured using signals transmitted and received between the wireless devices in a wireless communication system.

Embodiments of the present invention provide an apparatus and a method for calibrating a measurement error that may be generated when a range is measured using transmission and reception of signals through wireless devices in a wireless communication system.

Embodiments of the present invention provide an apparatus and a method optimized for a range measurement error calibration by measuring a range measurement error through a method of measuring a range between wireless devices based on signals transmitted and received between the wireless devices in a wireless communication system.

Technical Solution

According to an embodiment of the present invention, an apparatus of a first wireless device for a range measurement in a wireless communication system is provided. The apparatus includes: a transceiver configured to transmit a request range packet to a second wireless device and to receive a response range packet corresponding to the request range packet from the second wireless device; and a range estimator configured to estimate a range between the first wireless device and the second wireless device based on a first time difference from a time point when the request range packet is transmitted to a time point when reception of the response range packet is detected, a second time difference from a time point when reception of the request range packet is detected by the second wireless device to a time point when the response range packet is transmitted, and internal circuit delays of the first wireless device and the second wireless device.

According to another embodiment of the present invention, a method of operating a first wireless device for a range measurement in a wireless communication system is provided. The method includes: transmitting a request range packet to a second wireless device; receiving a response range packet corresponding to the request range packet from the second wireless device; and estimating a range between the first wireless device and the second wireless device based on a first time difference from a time point when the request range packet is transmitted to a time point when reception of the response range packet is detected, a second time difference from a time point when reception of the request range packet is detected by the second wireless device to a time point when the response range packet is transmitted, and internal circuit delays of the first wireless device and the second wireless device.

According to the other embodiment of the present invention, a device for measuring a distance is provided. The device comprises a transceiver configured to transmit, to another device, a signal and receive, from the another device, another signal according to the signal, and a controller configured to determine a first interval based on the signal and the another signal, and determine a distance between the device and the another device based on the first interval, a second time interval regarding the another device, and a delay regarding an internal circuit of the device.

According to the other embodiment of the present invention, a method of operating a device for measuring a distance is provided. The method comprises transmitting, to another device, a signal, receiving, from the another device, another signal according to the signal, determining a first interval based on the signal and the another signal, and determining a distance between the device and the another device based on the first interval, a second interval regarding the another device, and a delay regarding an internal circuit of the device.

Effects of the Invention

According to embodiments of the present invention, it is possible to perform a range measurement having a resolution of several cm by using an exchange of signals through wireless devices in a wireless communication system. Further, according to embodiments of the present invention, it is possible to rapidly measure a range between wireless devices by using range packets, to provide a user with inaccuracy (reliability) of the range measurement which may be generated by an influence of a multi-path channel, and to minimize power consumption of a range estimator by using signals used in the existing modem. Moreover, according to embodiments of the present invention, in measurement of the range between wireless devices through signals transmitted and received between the wireless devices in the wireless communication system, it is possible to accurately measure the range between the wireless devices by compensating for an internal circuit delay of the wireless device that exists as the range measurement error.

BRIEF DESCRIPTION OF THE DRAWINGS

The following description is made with reference to the accompanying drawings for a more complete understanding of the present invention and effects thereof, and the same reference numerals indicate the same parts.

MODE FOR CARRYING OUT THE INVENTION

In this patent specification, FIGS. 1 to 17 used for describing principles of the present invention are merely for examples and should not be interpreted to limit the scope of the present invention. Those skilled in the art can understand that the principles of the present invention can be implemented in any properly arranged wireless communication system.

Embodiments of the present invention to be described hereinafter propose an apparatus and a method for measuring a range having a resolution of several centimeters (cm) through an exchange of signals through wireless devices in a wireless communication system. Particularly, embodiments of the present invention propose a signal processing method for measuring a range having a high resolution and a signal processing method for rapidly measuring a range between wireless devices. Further, embodiments of the present invention propose an apparatus for minimizing power consumption while resolving inaccuracy of range measurement that may be generated by an influence of a multi-path channel. In addition, embodiments of the present invention propose an apparatus and a method for accurately estimating a range between wireless devices by calibrating an internal circuit delay of the wireless device when the range between the wireless devices is measured using signals transmitted and received between the wireless devices in a wireless communication system.

For example, according to an embodiment of the present invention, the wireless device may be a portable electronic device having a wireless access function such as a smart phone. In another example, the wireless device may be one of a portable terminal, a mobile phone, a mobile pad, a media player, a tablet computer, a handheld computer, a wireless accessible camera, a smart television, and a Personal Digital Assistant (PDA). In another example, the wireless device may be a device having a combination of two or more functions of the above described devices.

According to an embodiment, a wireless communication system may be a Device-to-Device (D2D) network. According to another embodiment, the wireless communication system may be a Local Area Network (LAN). According to another embodiment, the wireless communication system may be a wireless network that supports a group play function between devices.

Figure 1:
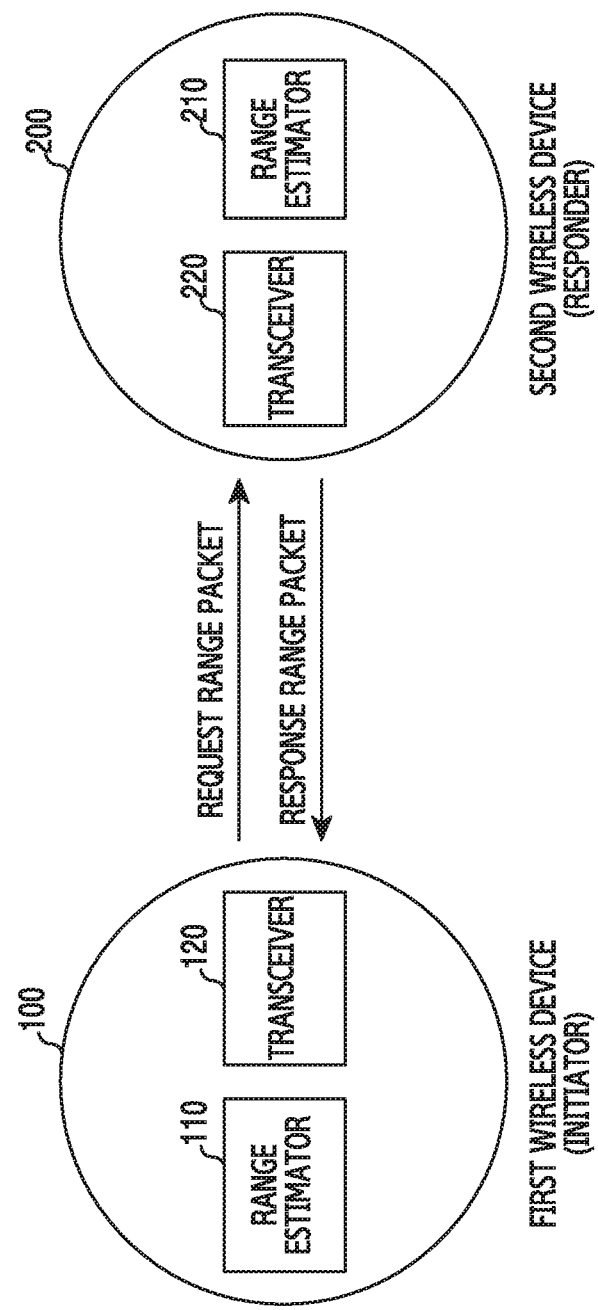
FIG. 1 illustrates an operation for measuring a range between wireless devices according to embodiments of the present invention.

FIG. 1 illustrates an operation for measuring a range between wireless devices according to embodiments of the present invention. In here, the range between wireless devices may mean a distance between the wireless devices. The operation illustrated in FIG. 1 merely corresponds to an example for describing the present invention and can be variously changed, and thus should not be interpreted to limit the scope of the present invention.

Referring to FIG. 1, a first wireless device 100 corresponds to an initiator defined as a wireless device that is a subject to measure a range and includes a range estimator 110 and a transceiver 120. A second wireless device 200 corresponds to a responder defined as a wireless device that is an object of which a range is measured by the first wireless device 100 and includes a range estimator 210 and a transceiver 220.

The transceiver 120 transmits a request range packet to the second wireless device 200 and receives a response range packet corresponding to the request range packet from the second wireless device 200. The transceiver 220 receives the request range packet from the first wireless device 100 and transmits the response range packet to the first wireless device 100.

The range estimator 110 estimates a range between the first wireless device 100 and the second wireless device 200. The range estimator 110 estimates the range between the first wireless device 100 and the second wireless device 200 based on a first time difference (Ti) from a time point when the request range packet is transmitted to a time point when reception of the response range packet is detected, a second time difference (Tr) from a time point when reception of the request range packet is detected, which is calculated by the range estimator 210 of the second wireless device 200, to a time point when the response range packet is transmitted, and an internal circuit delay of the first wireless device 100 and the second wireless device 200.

According to an embodiment, the range estimator 110 may include an error calibration module for measuring the internal circuit delay of the first wireless device 100 and performing an error calibration for the range between the first wireless device 100 and the second wireless device 200, which is estimated based on the first time difference, the second time difference, and the internal circuit delay of the second wireless device 200, based on the measured internal circuit delay.

Figure 2:
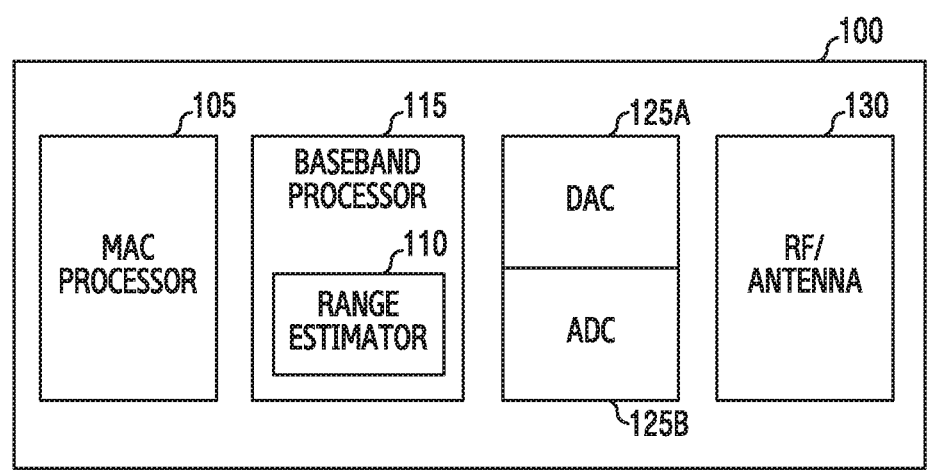
FIG. 2 illustrates a configuration of a first wireless device according to an embodiment of the present invention.

FIG. 2 illustrates a configuration of the first wireless device 100 according to an embodiment of the present invention. The configuration illustrated in FIG. 2 merely corresponds to an example for describing the present invention and can be variously changed, and thus should not be interpreted to limit the scope of the present invention.

Referring to FIG. 2, the first wireless device 100 includes a Medium Access Control (MAC) processor 105, a baseband processor 115, a digital to Analog Converter (DAC) 125A, an Analog to Digital Converter (ADC) 125B, and a Radio Frequency (RF) circuit/antenna 130. The baseband processor 115 includes the range estimator 110. The DAC 125A, the ADC 125B, and the RF circuit/antenna 130 constitute the transceiver 120 of FIG. 1.

The MAC processor 105 generates information for range measurement. For example, the MAC processor 105 generates a range start signal in a range estimation period. In another example, the MAC processor 105 generates a DMG beacon including a DMG (Directional Multigigabit) range element, a probe request, a probe response, an information request, or an information response in a capability negotiation period. The baseband processor 115 inputs information generated by the MAC processor 105 and processes the information in the baseband. For example, the baseband processor 115 receives and processes the range start signal and then generates a request range packet. The DAC 125A converts a digital signal provided from the baseband processor 115 into an analog signal. The RF circuit/antenna 130 includes an RF circuit for processing a signal, which is to be transmitted and received, in an RF band and an antenna for transmitting the transmitted signal processed by the RF circuit to the air, receiving the signal received from the air, and providing the signal to the RF circuit. The RF circuit/antenna 130 transmits the analog signal converted by the DAC 125A to the second wireless device 200.

The RF circuit/antenna 130 receives the signal from the second wireless device 200. The ADC 125B converts the analog signal received from the second wireless device 200 through the antenna 130 into a digital signal. The baseband processor 115 processes the digital signal converted by the ADC 125B in the baseband. For example, the baseband processor 115 processes the received response range packet and outputs the first time difference to the MAC processor 105.

The range estimator 110 estimates the range between the first wireless device 100 and the second wireless device 200. The range estimator 110 estimates the range between the first wireless device 100 and the second wireless device 200 based on a first time difference (Ti) from a time point when the request range packet is transmitted to a time point when reception of the response range packet is detected, a second time difference (Tr) from a time point when reception of the request range packet is detected by the second wireless device 200 to a time point when the response range packet is transmitted, and an internal circuit delay of the first wireless device 100 and the second wireless device 200.

According to an embodiment, the range estimator 110 may include an error calibration module for measuring the internal circuit delay of the first wireless device 100 and performing an error calibration for the range between the first wireless device 100 and the second wireless device 200, which is estimated based on the first time difference, the second time difference, and the internal circuit delay of the second wireless device 200, based on the measured internal circuit delay.

Figure 3:
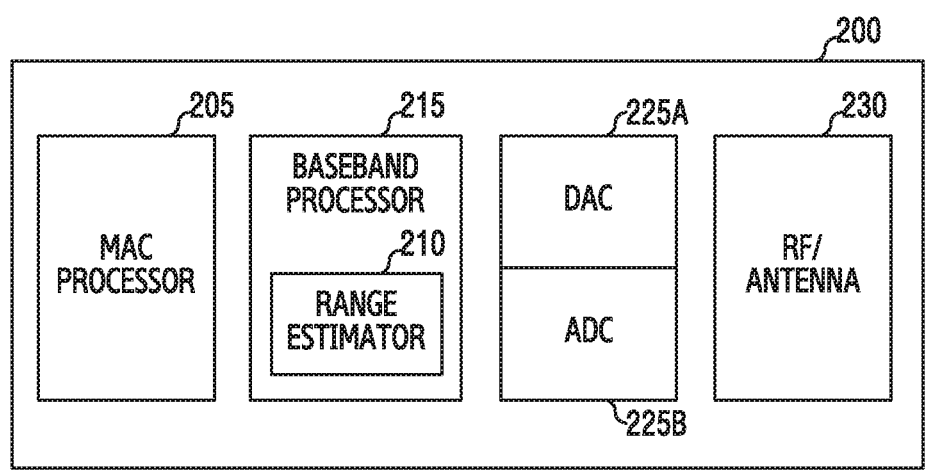
FIG. 3 illustrates a configuration of a second wireless device according to an embodiment of the present invention.

FIG. 3 illustrates a configuration of the second wireless device 200 according to an embodiment of the present invention. The configuration illustrated in FIG. 3 merely corresponds to an example for describing the present invention and can be variously changed, and thus should not be interpreted to limit the scope of the present invention.

Referring to FIG. 3, the second wireless device 200 includes an MAC processor 205, a baseband processor 215, a DAC 225A, an ADC 225B, and an RF circuit/antenna 230. The baseband processor 215 includes the range estimator

210. The DAC 225A, the ADC 225B, and the RF circuit/antenna 230 constitute the transceiver 220 of FIG. 1.

The RF circuit/antenna 230 receives a signal from the first wireless device 100. For example, the RF circuit/antenna 230 receives a request range packet from the first wireless device 100. The ADC 225B converts an analog signal received from the first wireless device 100 through the RF circuit/antenna 230 into a digital signal. The baseband processor 215 processes the digital signal converted by the ADC 225B in the baseband. For example, the baseband processor 215 processes the received request range packet and outputs the request range packet to the MAC processor 205.

The MAC processor 205 receives information for range measurement. For example, the MAC processor 205 receives a DMG beacon including a DMG range element, a probe request, a probe response, an information request, or an information response from the baseband processor 215.

Further, the MAC processor 205 generates response information for range measurement. For example, the MAC processor 205 generates a DMG beacon including a DMG range element corresponding to the received DMG range element, a probe request, a probe response, an information request, or an information response.

The baseband processor 215 inputs information generated by the MAC processor 205 and processes the information in the baseband. For example, the baseband processor 215 generates a response range packet corresponding to the received request range packet. The DAC 225A converts a digital signal provided from the baseband processor 215 into an analog signal. The RF circuit/antenna 230 transmits the analog signal provided from the DAC 225A to the first wireless device 100.

The range estimator 210 calculates a second time difference (Tr) from a time point when reception of the request range packet is detected by the second wireless device 200 to a time point when the response range packet is transmitted. Information on the calculated second time difference (Tr) is transmitted to the first wireless device 100 and used when the range estimator 110 estimates a range.

Figure 4A:
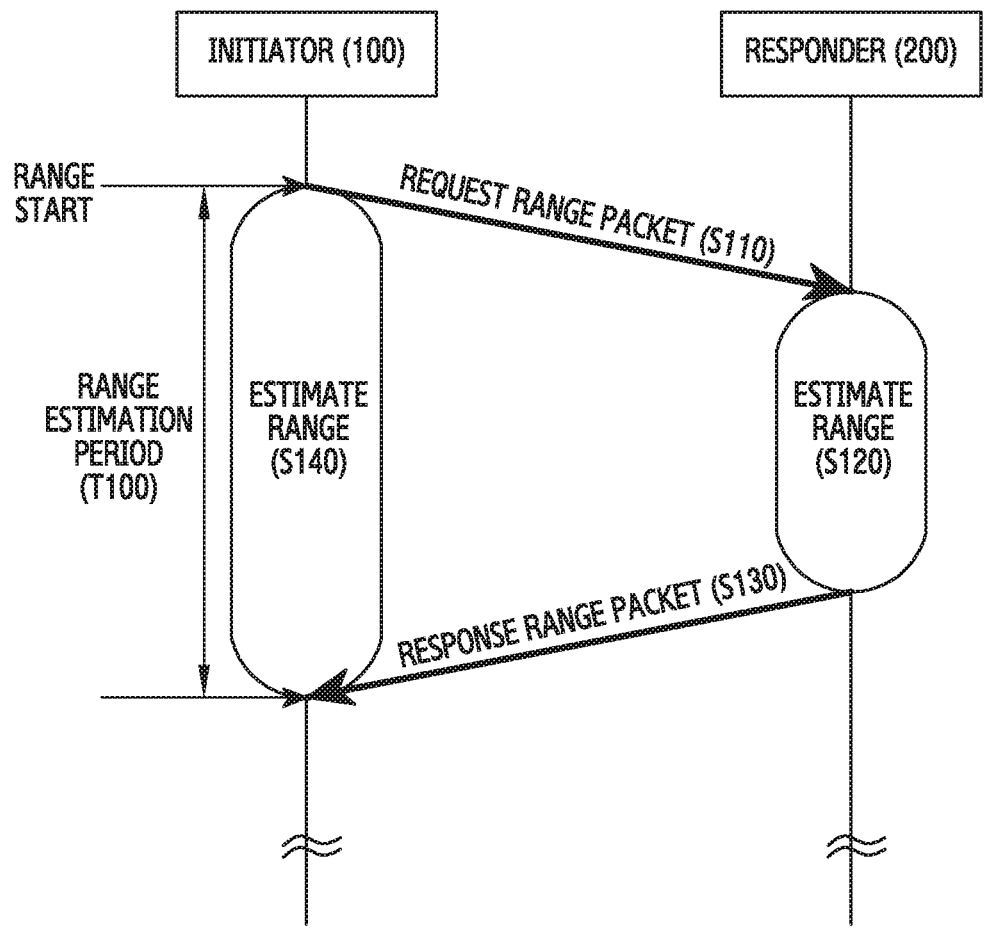
FIGS. 4A to 4D illustrates a processing flow of a range measurement operation by wireless devices according to embodiments of the present invention.
Figure 4B:
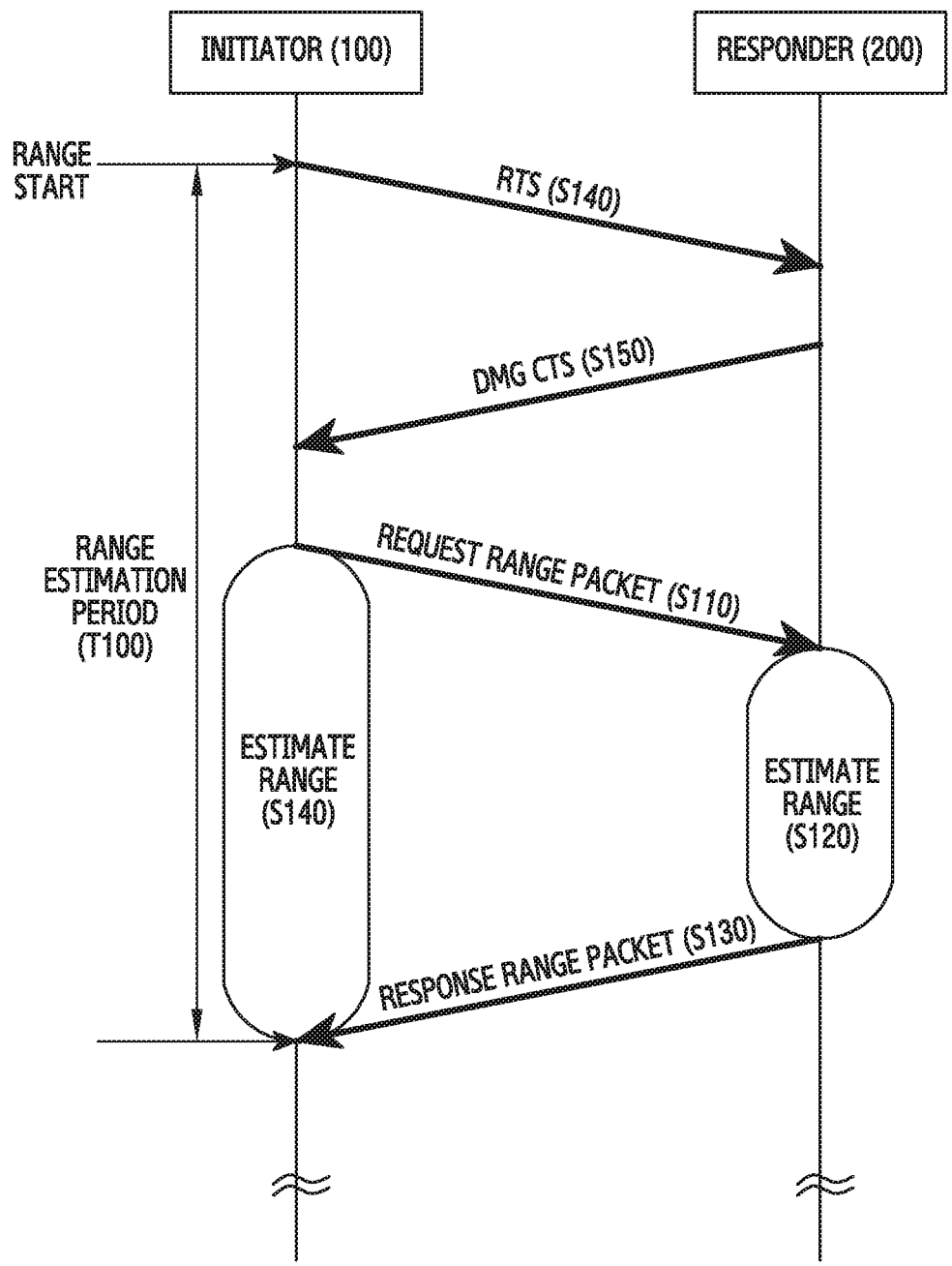
Figure 4C:
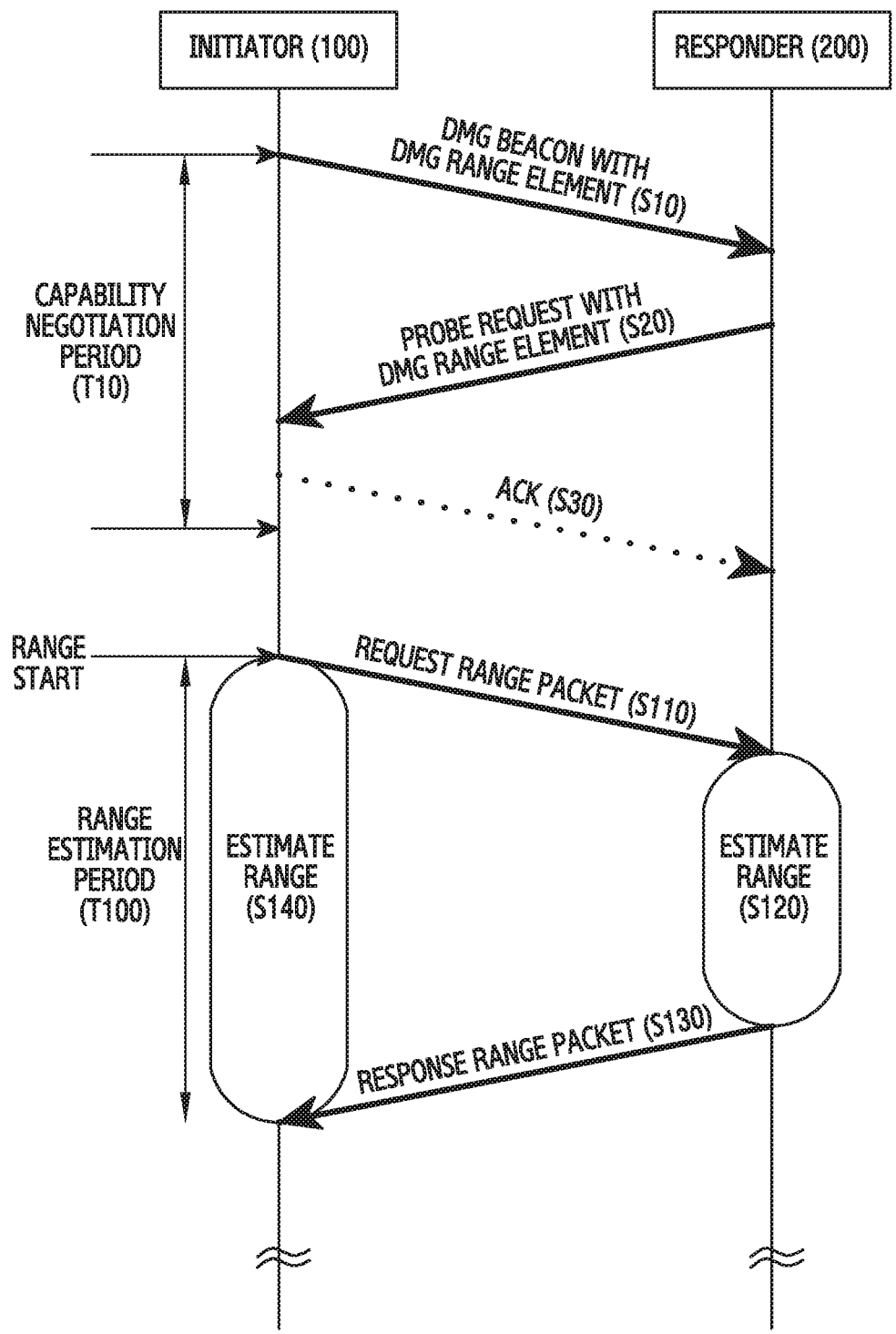
Figure 4D:
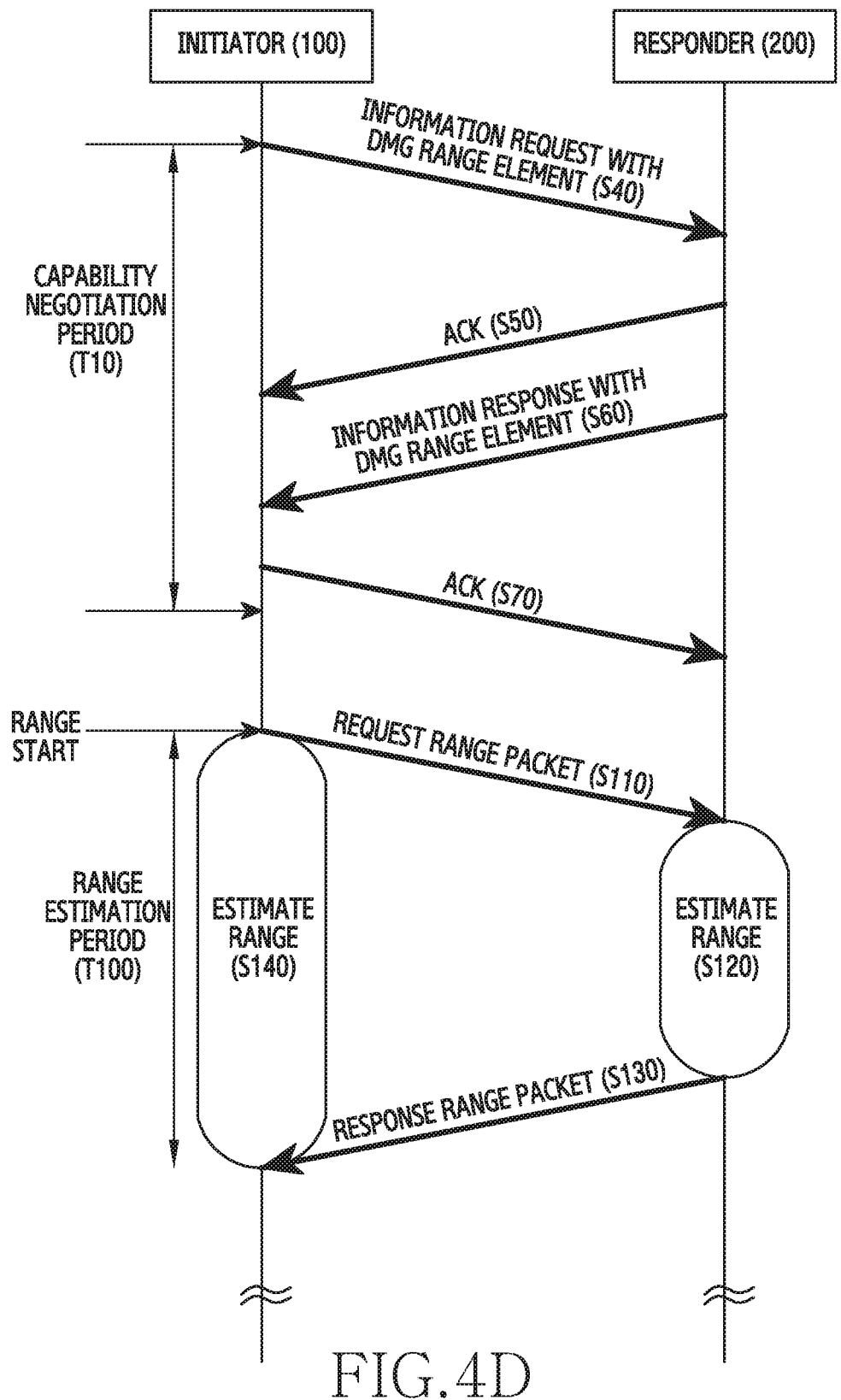

FIGS. 4A, 4B, 4C, and 4D illustrate a processing flow of a range measurement operation by a wireless device according to embodiments of the present invention. Flows illustrated in FIGS. 4A to 4D merely correspond to examples for describing the present invention and can be variously changed, and thus should not be interpreted to limit the protection scope of the present invention. FIGS. 4A and 4B illustrate the processing flow of the range measurement operation by a wireless device according to an embodiment of the present invention, and include one period, that is, a range estimation period T100 in which a range is measured. FIGS. 4C and 4D illustrate flows for processing a range measurement operation by a wireless device according to another embodiment of the present invention, and includes two periods, that is, a capability negotiation period T10 in which capabilities for range measurement are exchanged and a range estimation period T100 in which a range is measured. At this time, as illustrated in FIGS. 4A and 4B, only the range estimation period T100 may exist without the capability negotiation period T10.

Referring to FIG. 4A, the initiator 100 transmits a request range packet to the responder 200 based on a range start signal, and the responder 200 having received the request range packet transmits a response range packet to the initiator 100. Such a method may be used when a packet having destination information data is used as the request range packet. At this time, the initiator 100 estimates a range in S140, and the responder 200 estimates a range in S120.

Figure 7:
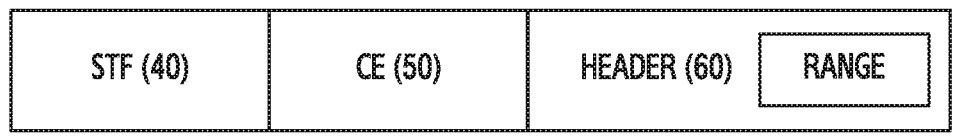
FIG. 7 illustrates a configuration of a null data packet among request range packets according to embodiments of the present invention.

Referring to FIG. 4B, the initiator 100 transmits an RTS S140 to the responder 200 based on the range start signal, and the responder 200 having received the RTS identifies that a destination of the request range packet to be transmitted by the initiator 100 corresponds to the initiator 100 while transmitting a DMG CTS S150 to the initiator 100. Such a method may be used when a null data packet (NDP) illustrated in FIG. 7 is used as the request range packet. Subsequently, the initiator 100 transmits the request range packet to the responder 200 of the identified destination, and the responder 200 having received the request range packet transmits the response range packet to the initiator 100. At this time, the initiator 100 estimates a range in S140, and the responder 200 estimates a range in S120.

Referring to FIGS. 4C and 4D, the range measurement operation is divided into the capability negotiation period T10 in which the first wireless device 100 and the second wireless device 200 exchange capabilities for range measurement and the range estimation period T100 in which a range is measured.

In the capability negotiation period T10, the first wireless device 100 and the second wireless device 200 exchange their own range measurement capabilities. For example, the first wireless device 100 and the second wireless device 200 exchange their own range measurement capability through the DMG beacon including Directional Multigigabit (DMG) range element, the probe request, the probe response, the information request, or the information response defined in FIG. 5.

Figure 5:
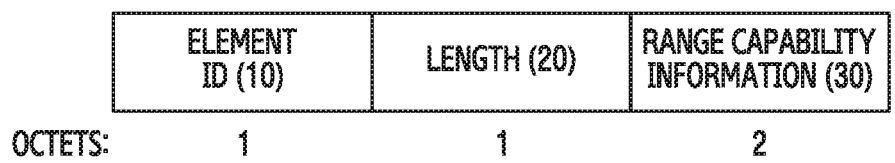
FIG. 5 illustrates a configuration of a DMG range element according to an embodiment of the present invention.

FIG. 5 illustrates a configuration of a DMG range element according to an embodiment of the present invention. The configuration illustrated in FIG. 5 merely corresponds to an example for describing the present invention and can be variously changed, and thus should not be interpreted to limit the scope of the present invention.

Referring to FIG. 5, the DMG range element includes an element ID field 10, a length field 20, and a range capability information field 30. For example, the element ID field 10, the length field 20, and the range capability information field 30 may include one octet, one octet, and two octets, respectively. The DMG range element may be defined as an element that advertises a range capability, the DMG range element being included in the DMG beacon, the probe request, the probe response, the information request, or the information response. In another example, the DMG range element may be defined as an element that advertises a range capability in an association request/response and a reassociation request/response.

Figure 6:
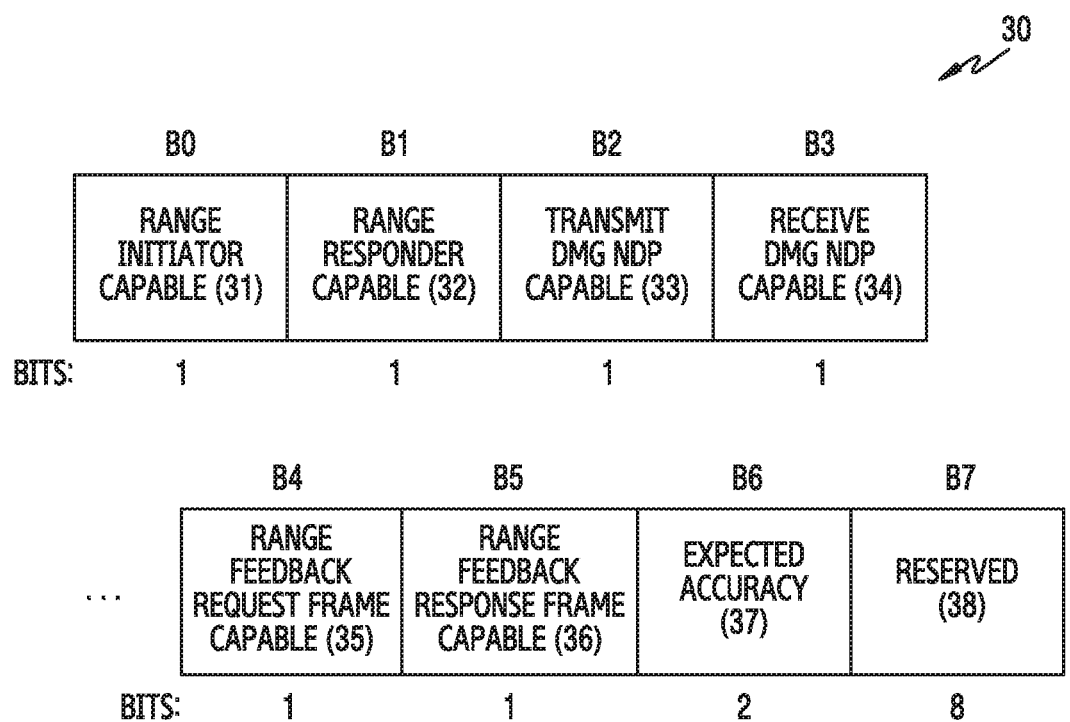
FIG. 6 illustrates a configuration of a range capability information field according to an embodiment of the present invention.

FIG. 6 illustrates a configuration of a range capability information field according to an embodiment of the present invention. The configuration illustrated in FIG. 6 merely corresponds to an example for describing the present invention and can be variously changed, and thus should not be interpreted to limit the scope of the present invention.

Referring to FIG. 6, a range capability information field 30 illustrated in FIG. 5 includes a range initiator capable subfield 31, a range responder capable subfield 32, a transmit Null Data Packet (NDP) capable subfield 33, a receive NDP capable subfield 34, a range feedback request frame capable subfield 35, a range feedback response frame capable subfield 36, an expected accuracy subfield 37, and a reserved subfield 38 that is reserved for an additional operation. Each subfield and encoding are defined as [Table 1] below.

TABLE 1

| Subfield | Definition | Encoding |
| --- | --- | --- |
| Range Initiator Capable | Whether STA can operate as Initiator | 0: impossible<br>1: possible |
| Range Responder Capable | Whether STA can operate as Responder | 0: impossible<br>1: possible |
| Transmit NDP Capable | Whether STA can transmit Null Data Packet | 0: impossible<br>1: possible |
| Receive NDP Capable | Whether STA can receive Null Data Packet | 0: impossible<br>1: possible |
| Range Feedback Request Frame Capable | Whether STA can use Range Feedback Request Frame | 0: impossible<br>1: possible |
| Range Feedback Response Frame Capable | Whether STA can use Range Feedback Response Frame | 0: impossible<br>1: possible |
| Expected Accuracy | Expected accuracy of range measurement | 0: no support<br>1: 1 cm<br>2: 10 cm<br>3: 1 m |

For example, when a value of the range initiator capable subfield is 0, it indicates that the wireless device or station (STA) cannot operate as the initiator for range measurement. When a value of the range responder capable subfield is 1, it indicates that the wireless device cannot operate as the responder for range measurement. When a value of the transmit NDP capable subfield is 1, it indicates that the wireless device can transmit a null data packet. When a value of the receive NDP capable subfield is 0, it indicates that the wireless device cannot receive a null data packet. When a value of the range feedback request frame capable subfield is 1, it indicates that the wireless device can use a range feedback request frame. When a value of the range feedback response frame capable subfield is 1, it indicates that the wireless device can use a range feedback response frame. When a value of the expected accuracy subfield is 1, it indicates that expected accuracy of range measurement which can be provided by the wireless device is 1 cm.

Referring back to FIG. 4C, the first wireless device 100 as the initiator and the second wireless device 200 as the responder exchange whether the station can operate as the initiator/responder, whether the station can receive/transmit the NDP, and whether the station can use the range feedback request/response frame through the range capability information field in the DMG range element while exchanging the DMG beacon and the probe request signal for scanning.

In step S10, the initiator 100 inserts the DMG range element including its own capability information into the DMG beacon and transmits the DMB beacon to the responder 200. In step S20, the responder 200 transmits the probe request including the DMG range element to the initiator 100 in response to the reception of the DMG beacon including the DMG range element. In step S30, the initiator 100 transmits ACK to the responder 200 in response to the reception of the probe response including the DMG range element.

Referring back to FIG. 4D, the first wireless device 100 as the initiator and the second wireless device 200 as the responder exchange whether the station can operate as the initiator/responder, whether the station can receive/transmit the NDP, and whether the station can use the range feedback request/response frame through the range capability information field in the DMG range element while exchanging the information request and information response signal.

In step S40, the initiator 100 inserts the DMG range element including its own capability information into the information request and transmits the information request to the responder 200. In step S50, the responder 200 transmits ACK to the initiator 100 in response to the reception of the information request including the DMG range element. In step S60, the responder 200 transmits the information response including the DMG range element to the initiator 100 in response to the reception of the information request including the DMG range element. In step S70, the initiator 100 transmits ACK to the responder 200 in response to the reception of the information response including the DMG range element.

As described above, since the initiator and the responder can exchange their own capability information, the initiator and the responder may rapidly go to the range estimation period T100 to be suitable for capabilities of the initiator and the responder without any separate operation.

FIG. 7 illustrates a configuration of a request range packet according to embodiments of the present invention. The configuration illustrated in FIG. 7 merely corresponds to an example for describing the present invention and can be variously changed, and thus should not be interpreted to limit the scope of the present invention.

Referring to FIG. 7, the request range packet corresponds to a packet which the station (or wireless device) transmits for the purpose of range measurement. The request range packet may have a form illustrated in FIG. 7. The request range packet illustrated in FIG. 7 includes a Short Training Field (STF) 40, a Channel Estimation (CE) field 50, and a header 60. The range packet illustrated in FIG. 7 indicates a range packet having an NDP. The header 60 includes a range field.

Due to an oscillator error between the initiator and the responder, it may be difficult to achieve accuracy of several cm by signal processing through a packet having long data. In this case, for range measurement having accuracy of high definition, it is proper to use the null data packet having no data illustrated in FIG. 7 as the request range packet.

Meanwhile, since not all the wireless devices can transmit and receive the NDP, it may be determined whether the NDP range packet can be used according to the device-specific range capability information defined in [Table 1]. Further, even though the NDP range packet cannot be used, the accuracy can be improved by providing a field shown in [Table 2] to the header 60 and reducing a signal processing time through a packet having long data.

TABLE 2

| Field | Definition | Encoding |
| --- | --- | --- |
| Range | Range packet or not | 0: No Range Packet<br>1: Range Packet |

For example, a value of the range field of the header 60 illustrated in FIG. 7 corresponding to 1 indicates a range packet and a value corresponding to 0 indicates no range packet.

Referring back to FIG. 4A, the range measurement operation is started by the range start signal in the range estimation period T100. The first wireless device 100 as the initiator transmits the request range packet to the second wireless device 200, and the second wireless device 200 transmits the response range packet to the first wireless device in response to the request range packet. This happens when the first wireless device uses a packet having data as the request range packet without using a null data packet, and any packet which allows the second wireless device to respond after a SIFS period may be used as the request range packet. For example, an RTS, a probe response, a request action frame, and the like may be used as the request range packet and, at this time, a DMG, a CTS, an ACK, and a response action frame may be used as the response range packet, respectively.

Referring back to FIG. 4B, the range measurement operation is started by the range start signal in the range estimation period T100. The first wireless device 100 as the initiator and the second wireless device 200 identify that a destination of the request range packet to be transmitted by the first wireless device corresponds to the responder 200 while exchanging the RTS and the DMG CTS in S140 and S150, and a null data packet is transmitted to the second wireless device from the first wireless device as the request range packet in S110. The performance is needed since the null data packet has an unclear packet destination. The second wireless device 200 transmits the response range packet to the first wireless device in response to the null data packet. At this time, ACK or a response action frame may be used for the response range packet in S130.

Figure 8:
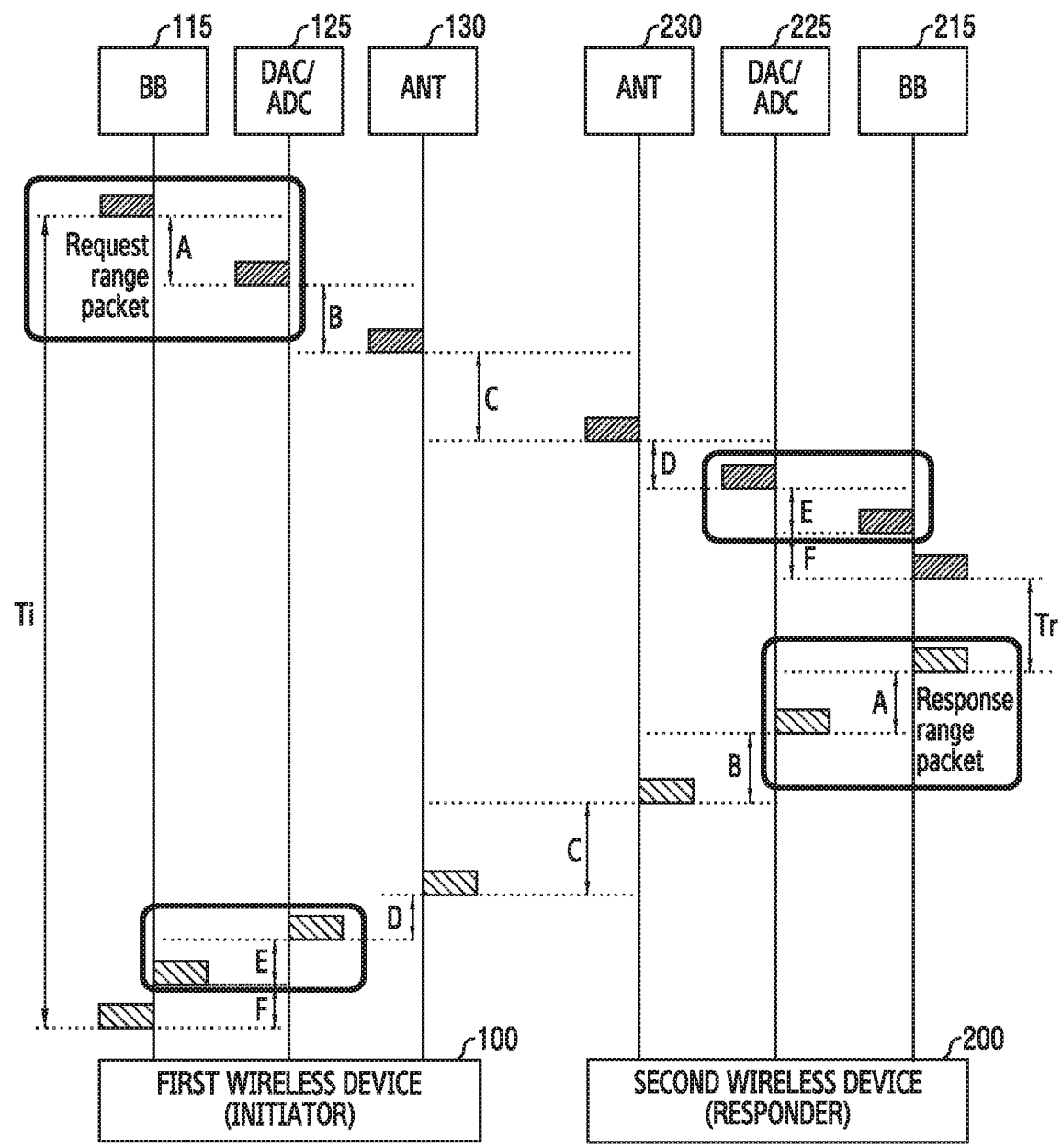
FIG. 8 illustrates a process for signal transmission and reception between wireless devices for the range measurement operation between the wireless devices according to embodiments of the present invention.

FIG. 8 illustrates a process for signal transmission and reception between wireless devices for the range measurement operation between the wireless devices according to embodiments of the present invention. For example, signals for the range measurement may be transmitted and received between the initiator 100 as the first wireless device and the responder 200 as the second wireless device illustrated in FIGS. 1 to 3. The process illustrated in FIG. 8 merely corresponds to an example for describing the present invention and can be variously changed, and thus should not be interpreted to limit the scope of the present invention.

Referring to FIG. 8, the wireless devices includes the initiator 100 defined as the first wireless device for measuring ranges and the responder 200 defined as the second wireless device of which the range is measured by the initiator 100. The initiator 100 transmits a request range packet to measure a range between the initiator 100 and the responder 200 and receives a response range packet from the responder 200 in response to the request range packet. Symbols A to F for time delays occurring while the initiator 100 and the responder 200 exchange the range packets are illustrated. Such symbols are defined as [Table 3] below.

TABLE 3

| Symbol | Description |
| --- | --- |
| Ti | Time for Clock Counter of Initiator |
| Tr | Time for Clock Counter of Responder |
| A | DAC Delay |
| B | Transmit Circuit Delay |
| C | Propagation Delay |
| D | Receive Circuit Delay |
| E | ADC Delay |
| F | Processing Delay of BB |

[Table 3], Ti denotes a time difference between a time point when the baseband processor 115 of the initiator 100 transmits the request range packet and a time point when the response range packet transmitted from the responder 200 is received. Tr denotes a time difference between a time point when the baseband processor 215 of the responder 200 receives the request range packet transmitted from the initiator 100 and a time point when the response range packet is transmitted. Ti and Tr may be measured by a clock counter. A corresponds to a delay of the DAC 125A of the initiator 100 and a delay of the DAC 225A of the responder 200. B corresponds to a transmit circuit delay between the DAC 125A of the initiator 100 and the antenna 130 and a transmit circuit delay between the DAC 225A of the responder 200 and the antenna 230. C corresponds to a propagation delay between the initiator 100 and the responder 200. D corresponds to a receive circuit delay between the antenna 230 and the ADC 225B of the responder 200 and a receive circuit delay between the antenna 230 and the ADC 225B of the responder 200. E corresponds to a delay of the ADC 225B of the responder 200 and a delay of the ADC 125B of the initiator 100. F corresponds to a processing delay of the baseband processor 215 of the responder 200 and a processing delay of the baseband processor 115 (BB) of the initiator 200.

Figure 9:
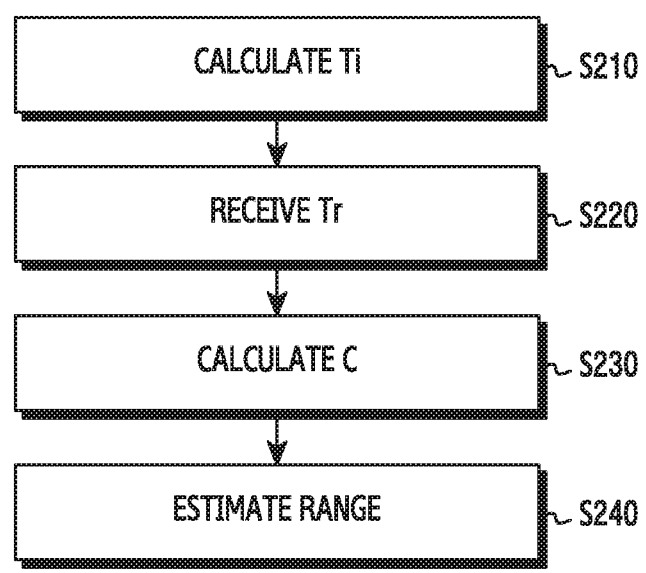
FIG. 9 illustrates a processing flow of the range measurement operation between wireless devices according to an embodiment of the present invention.

FIG. 9 illustrates a processing flow of a range measurement operation between wireless devices according to an embodiment of the present invention. Such a processing flow may be performed by, for example, the range estimator 110 included in the baseband processor 115 of the initiator 100 illustrated in FIG. 2. The flow illustrated in FIG. 9 merely corresponds to an example for describing the present invention and can be variously changed, and thus should not be interpreted to limit the scope of the present invention.

Referring to FIG. 9, in order to measure a range from the responder 200, the initiator 100 should know a time during which request and response range packets are in the air. That is, a propagation delay C defined in [Table 4] should be known. In order to obtain C, the range estimator 110 of the initiator 100 calculates a time Ti from a time point when a request range packet is generated and transmitted to a time point when a response range packet transmitted by the responder 200 is detected, and the range estimator 210 of the responder 200 calculates a time Tr from a time point when the request range packet transmitted by the initiator 100 is detected to a time point when a response range packet is transmitted in response to the request range packet. At this time, there may be various methods by which each of the initiator 100 and the responder e200 detects the response range packet and the request range packet. For example, there are a method of searching for a time point when a start point of the range packet enters the baseband processor, a method of searching for a peak of a channel impulse response, and a method of searching for a CIR peak and using a sample timing offset.

In step S210, the range estimator 110 of the initiator 100 calculates the time Ti from the time point when the request range packet is generated and transmitted to the time point when the response range packet transmitted by the responder 200 is detected. In step S220, the range estimator 110 of the initiator 100 receives the time Tr calculated by the range estimator 210 of the responder 200.

In step S230, the range estimator 110 of the initiator 100 calculates the propagation delay C from the calculated Ti and Tr. If it is assumed that A, B, D, E, and F of the initiator 100 and the responder 200 are the same, Ti may be defined as equation (1) below.

$$Ti = Tr + 2C + 2(A+B+D+E+F) \quad \text{equation (1)}$$

Equation (2) may be generated from equation (1) and the propagation delay C can be obtained therefrom.

$$C = (Ti-Tr)/2 - (A+B+D+E+F) \quad \text{equation (2)}$$

In step S230, the range estimator 110 of the initiator 100 estimates the range between the initiator 100 and the responder 200 by applying C calculated through equation (2) to equation (3).

$$\text{Range} = C * \text{speed of light} \quad \text{equation (3)}$$

Figure 10A:
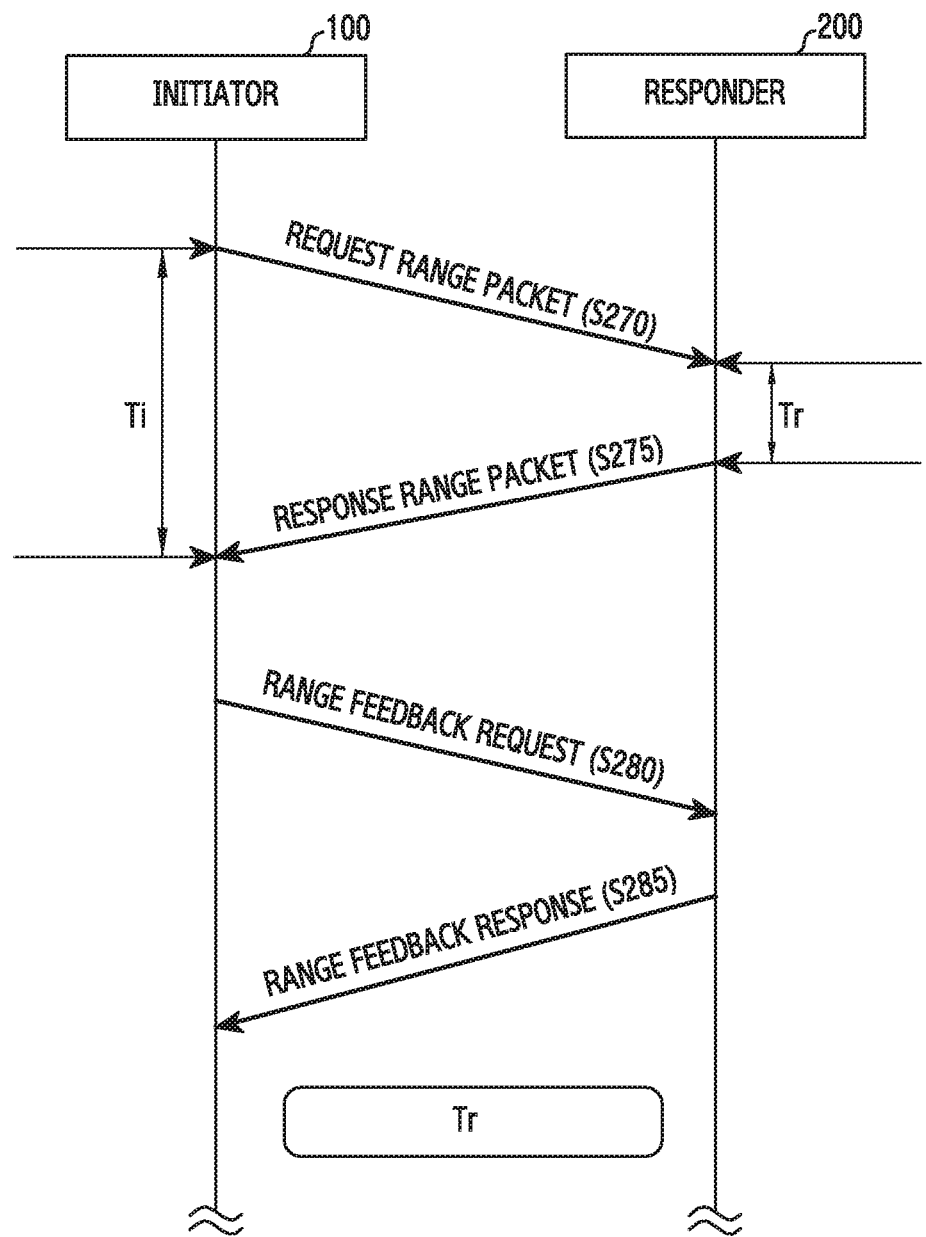
FIGS. 10A to 10C illustrate signals transmitted and received between an initiator and a responder for the range measurement operation between wireless devices according to an embodiment of the present invention.

FIG. 10A illustrates signals transmitted and received between the initiator 100 and the responder 200 for the range measurement operation between wireless devices according to an embodiment of the present invention. The signals illustrated in FIG. 10A merely corresponds to an example for describing the present invention and can be variously changed, and thus should not be interpreted to limit the scope of the present invention.

Referring to FIG. 10A, the initiator 100 transmits a request range packet to the responder 200 in S270, and the responder 200 transmits a response range packet to the initiator 100 in S275. As described above, the initiator 100 and the responder 200 acquire Ti and Tr, respectively, by transmitting and receiving the range packets. Subsequently, the initiator 100 makes a request for Tr by transmitting a range feedback request illustrated in FIG. 10B to the responder 200 in S280, and the responder 200 carries Tr on a range feedback response illustrated in FIG. 10C and transmits the range feedback response to the initiator 100 in S285.

Both the range feedback request and the range feedback response frame may be used as an action frame having a category that carries range information. At this time, when management frame protection is negotiated, the range feedback request and the range feedback response frame may be used as the range protection action frame. Otherwise, the range feedback request and the range feedback response frame may be used as the range action frame.

Figure 10B:
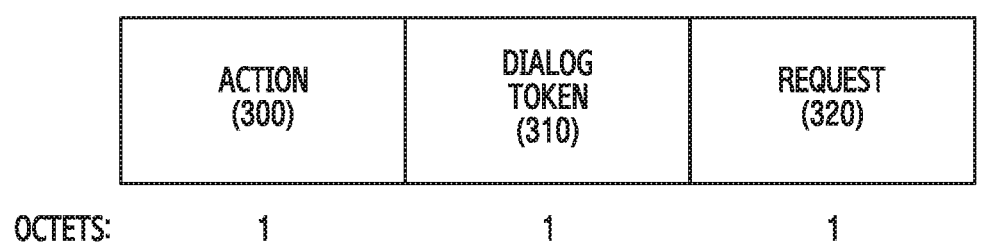

The range feedback request illustrated in FIG. 10B is a packet transmitted by the initiator 100 for the purpose of making a request for Tr to the responder 200. The range feedback request illustrated in FIG. 10B includes an action field 300, a dialog token field 310, and a request field 320.

Figure 10C:
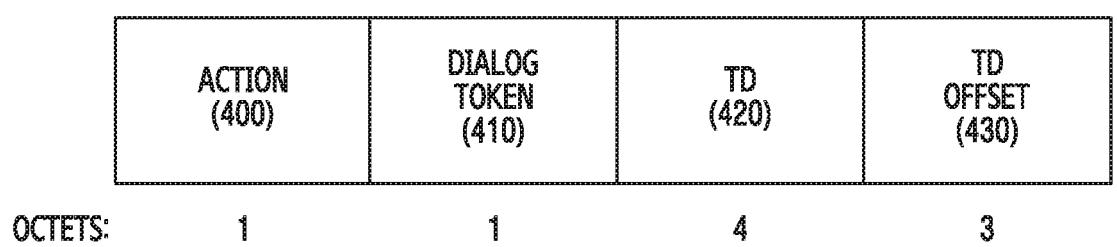

The range feedback response illustrated in FIG. 10C is a packet which the responder 200 transmits to the initiator 100 in response to the range feedback request of the initiator 100. The range feedback request illustrated in FIG. 10C includes an action field 400, a dialog token field 410, a time difference (TD) field 420, and a time difference offset (TD offset) field 430. When the null data packet is used as the request range packet, the range feedback response may be used as a response thereto.

Each of the fields in FIGS. 10B and 10C is defined as [Table 4] and [Table 5] below.

TABLE 4

| Field | Definition | Encoding |
|---|---|---|
| Action | Range feedback request or range feedback response | 0: range feedback request 1: range feedback response |
| Dialog Token | Set an integer, which is not 0, to identify transmission and reception | |
| Request | Whether a range feedback response is requested | 0: do not make request 1: make request |

TABLE 5

| Field | Definition | Encoding |
|---|---|---|
| Action | Range feedback request or range feedback response | 0: range feedback request 1: range feedback response |
| Dialog Token | Write a value used for the range feedback request without any change, and set 0 when it is used as a response to the NDP | |
| TD | Write Tr and Tor | |
| TD Offset | Offset value of TD | |

According to the above described embodiment of the present invention, the range between the wireless devices is estimated by measuring the time during which the signal transmitted and received between the wireless devices of the wireless communication system is in the air.

Meanwhile, according to such a range estimation scheme, since there is a delay time by circuits included in the wireless devices in signal transmission and reception, the measurement of the range between the wireless devices may not be accurately performed if the delay time is not accurately measured. For example, the circuit delay in the wireless devices includes a DAC delay, an ADC delay, a transmit circuit delay, and a receive circuit delay. In other words, if the range is measured only through Ti and Tr in equation (2), A, B, D, E, and F correspond to range measurement errors. When the range measurement error is an invariable constant (reference value), C can be easily acquired if the responder 200 transmits Tr to the initiator 100 and the initiator 100 calibrates the reference value. However, if the reference value is used, the range measurement may be inaccurate because A and E, that is, the DAC/ADC delay varies when power is newly supplied to the wireless device or the wireless device is reset. Accordingly, hereinafter, embodiments for measuring the range measurement error according to the circuit delay in the wireless devices and calibrating the range measurement error measured when the range between wireless devices is estimated will be proposed.

Figure 11:
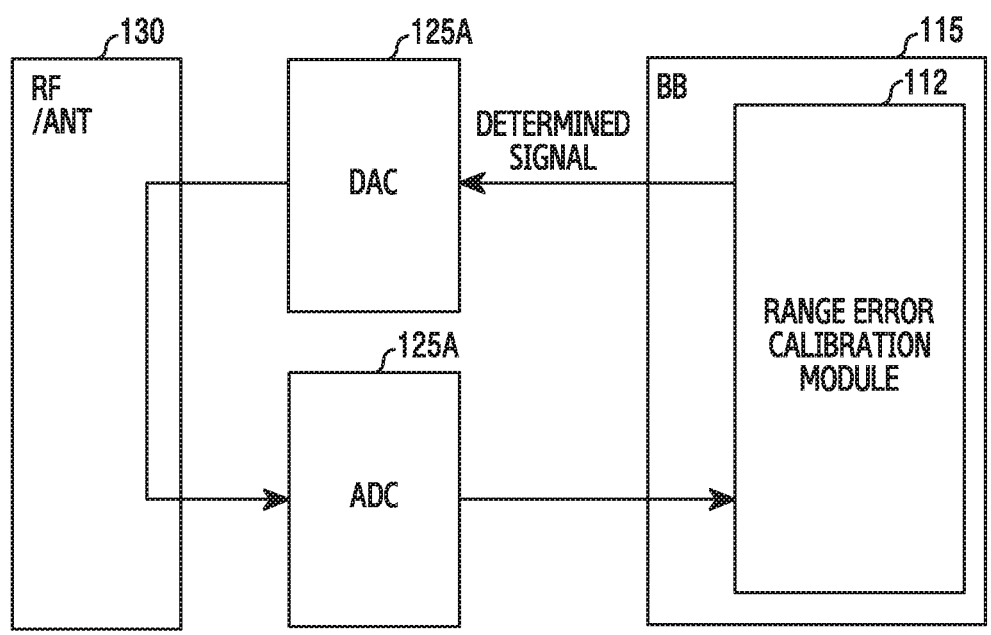
FIG. 11 illustrates a connection configuration of a range error calibration module for the range measurement operation between wireless devices according to another embodiment of the present invention.

FIG. 11 illustrates a connection configuration of a range error calibration module for the range measurement operation between wireless devices according to another embodiment of the present invention. The configuration illustrated in FIG. 11 merely corresponds to an example for describing the present invention and can be variously changed, and thus should not be interpreted to limit the scope of the present invention.

Referring to FIG. 11, the wireless device 100 includes the baseband processor 115 including the range error calibration module 112, the DAC 125A, the ADC 125B, and the RF circuit/antenna 130. The range error calibration module 112 for measuring and calibrating the range measurement error according to the circuit delay in the wireless device may be included in the range estimator 110 illustrated in FIGS. 1 to 3 or may be separated from the range estimator 110. A predetermined signal is transmitted from the range error calibration module 112 of the baseband processor 115. The determined signal returns to the range error calibration module 112 via the loopback circuit including the DAC 125A, the RF circuit/antenna 130, and the ADC 125B. According to an embodiment, the determined signal may be a request range packet. According to another embodiment, the determined signal may be a predetermined signal. For example, the determined signal may be one of a single tone signal, a sinewave signal, and a signal having a correlation characteristic. Here, although the range error calibration module 112 included in the initiator 100 is illustrated, the range error calibration module 112 may be configured within the responder 200 in the same form. According to an embodiment, the range error calibration may be performed when power of the wireless device is newly applied. According to another embodiment, the range error calibration may be performed when the wireless device is reset. According to another embodiment, the range error calibration may be performed every time before the range is measured as necessary.

An embodiment to be described in FIGS. 12A to 14 corresponds to an embodiment in which the internal circuit delay Toi of the initiator 100, that is, the range measurement error is measured and the measured error is calibrated when the range is measured as the range error calibration module 112 of the initiator 100 illustrated in FIG. 11 generates and is looped back the range packet. The responder 200 may measure the internal circuit delay Tor in the same type.

Figure 12A:
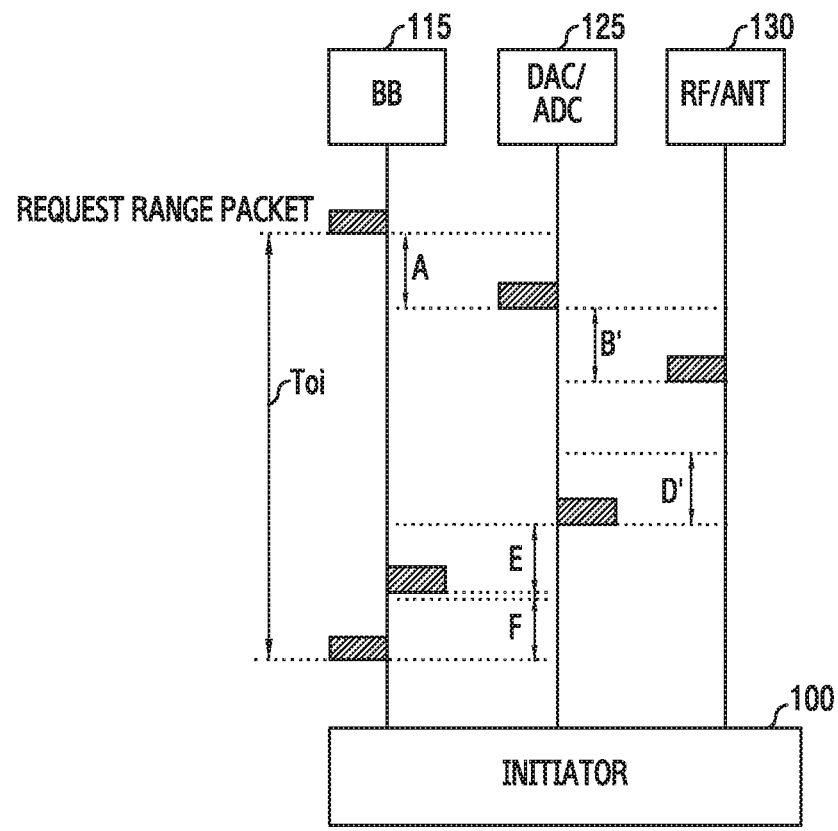
FIGS. 12A and 12B illustrate measurement of the internal circuit delay of the wireless device for the range measurement operation between the wireless devices according to another embodiment of the present invention.
Figure 12B:
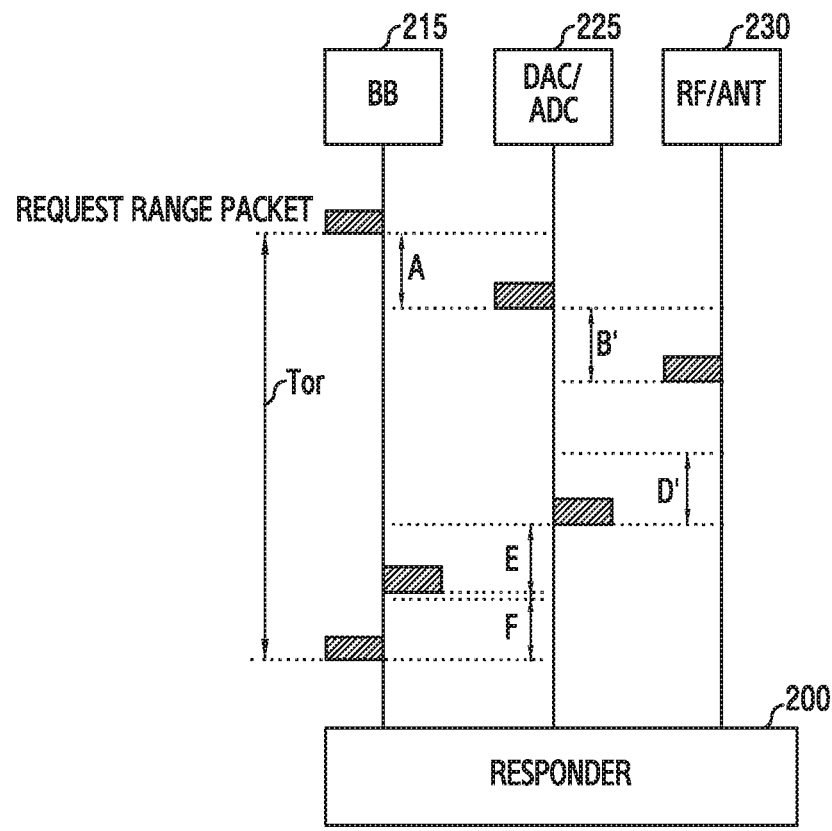

FIGS. 12A and 12B illustrate measurement of the internal circuit delay of the wireless device for the range measurement operation between the wireless devices according to another embodiment of the present invention.

Referring to FIG. 12A, the initiator 100 performs a range calibration by the range error calibration module 112 illustrated in FIG. 11 and acquires Toi as a result of the range calibration.

Figure 13:
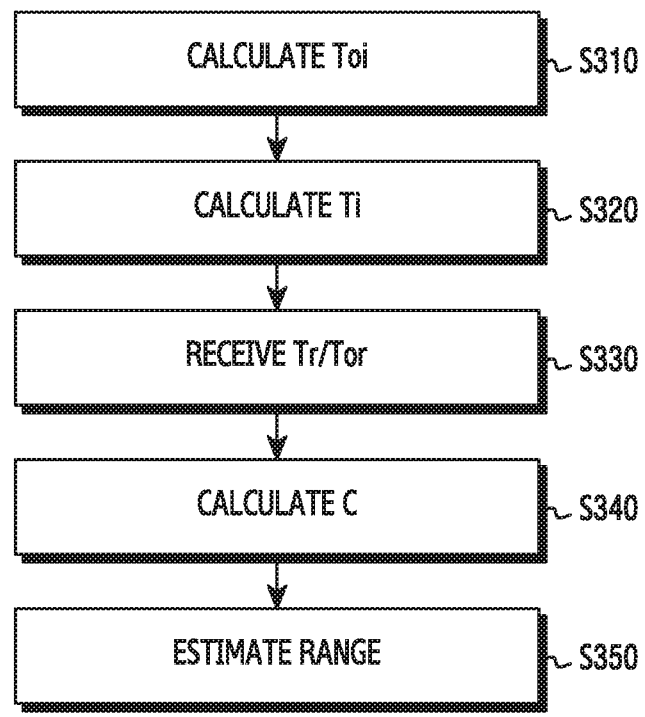
FIG. 13 illustrates a processing flow of the range measurement operation between wireless devices according to another embodiment of the present invention.

Referring to FIG. 12B, similarly, the responder 200 performs a range calibration by the range error compensation module and acquires Tor as a result of the range calibration FIG. 13 illustrates a processing flow of the range measurement operation between wireless devices according to another embodiment of the present invention. The processing flow is performed by the range estimator 110 and the range error calibration module 112 included in the baseband processor 115 of the initiator 100. The flow illustrated in FIG. 13 merely corresponds to an example for describing the present invention and can be variously changed, and thus should not be interpreted to limit the scope of the present invention.

Referring to FIG. 13, the range error calibration module 112 of the initiator 100 calculates a time Toi from a time point when a request range packet is transmitted to a time point when the transmitted range packet is returned in step S310. At this time, the range packet is looped back after sequentially passing through the DAC 125A, the RF circuit 130, and the ADC 125B as illustrated in FIG. 12A. Similarly, the range error calibration module of the responder 200 may calculate a time Tor from a time point when a request range packet is transmitted to a time point when the transmitted range packet is returned. The range measurement error Toi may be calculated by the range estimator 110 instead of the range error calibration module 112.

If it is assumed that the range measurement errors A, B, D, E, and F of the initiator 100 and the responder 200 are the same, Toi and Tor may be acquired from equation (4) below.

$$Toi = Tor = A + B' + D' + E + F \quad \text{equation (4)}$$

Here, it may be assumed that a difference between transmit circuit delays B and B' and a difference between receive circuit delays D and D' are almost the same, the difference being a negligible value.

In step S320, the range estimator 110 of the initiator 100 calculates the time Ti from the time point when the request range packet is transmitted to the responder 200 to a time point when reception of a response range packet is detected in response to the transmitted request range packet as illustrated in FIG. 8.

Equation (5) below can be acquired by applying the range measurement errors Toi and Tor acquired from equation (4) to equation (2).

$$C = \frac{\{(Ti - Toi) - (Tr + Tor)\}}{2} \quad \text{equation (5)}$$

In step S330, the range estimator 110 of the initiator 100 receives Tr and Tor from the responder 200. Tr and Tor from the responder 200 may be received at the same time or at different time points.

In step S340, the range estimator 110 of the initiator 100 calculates a propagation delay C between the initiator 100 and the responder 200 by applying the time Toi, Ti, Tr, and Tor acquired in steps S310 to S330 to equation (5).

In step S350, the range estimator 110 of the initiator 100 estimates the range between the initiator 100 and the responder 200 by applying C calculated through equation (5) to equation (3). At this time, the accurate range measurement can be performed according to the above embodiment even though the internal circuit of the initiator 100, for example, the DAC delay and the ADC delay are changed.

Figure 14:
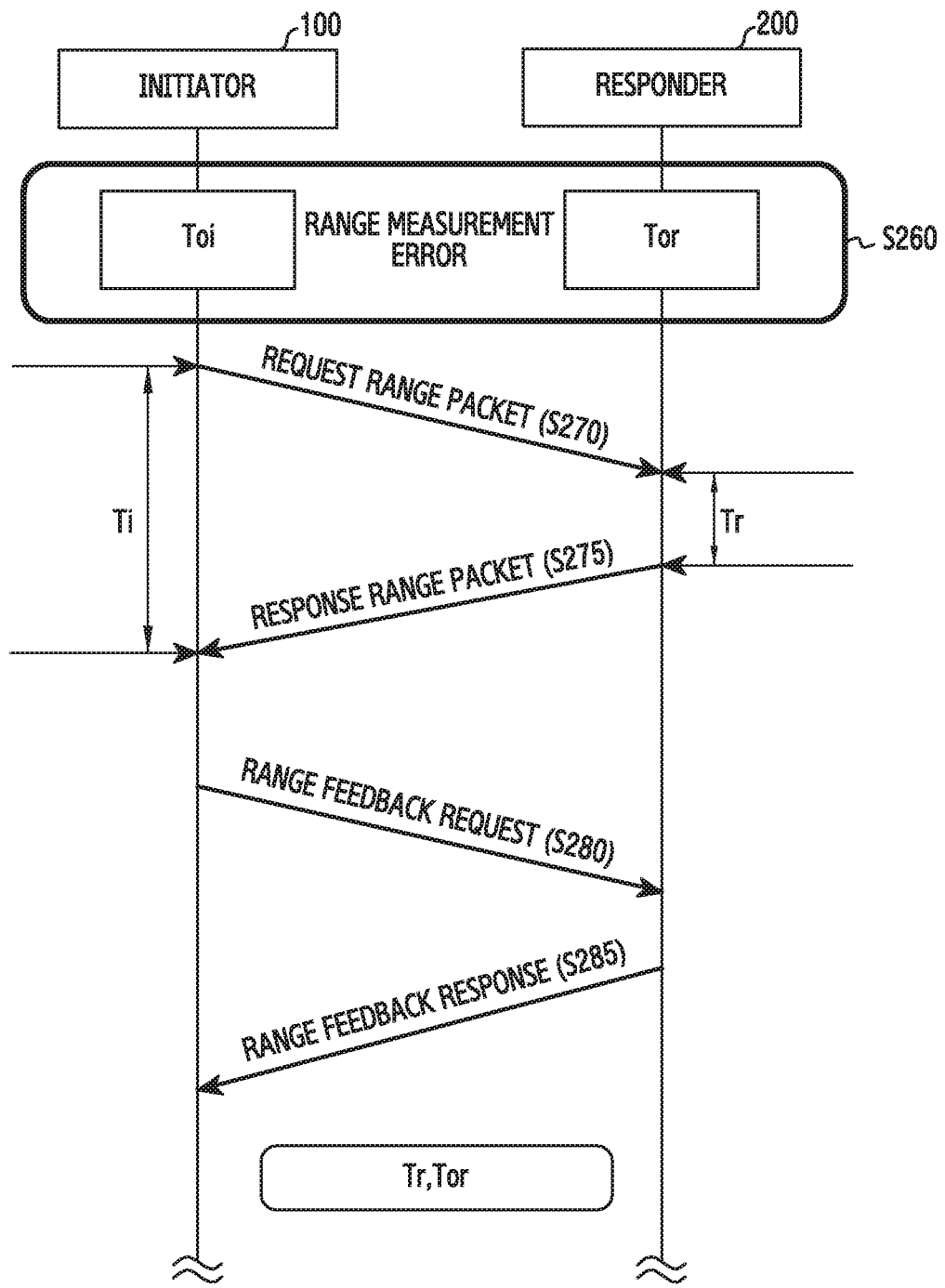
FIG. 14 illustrates signals transmitted and received between the initiator and the responder for the range measurement operation between wireless devices according to another embodiment of the present invention.

FIG. 14 illustrates signals transmitted and received between the initiator 100 and the responder 200 for the range measurement operation between wireless devices according to another embodiment of the present invention. The signals illustrated in FIG. 14 merely corresponds to an example for describing the present invention and can be variously changed, and thus should not be interpreted to limit the scope of the present invention.

Referring to FIG. 14, the initiator 100 and the responder 200 measure range measurement errors Toi and Tor corresponding to internal circuit delays, respectively, in S260. The initiator 100 transmits a request range packet to the responder 200 in S270, and the responder 200 transmits a response range packet to the initiator 100 in S275. As described above, the initiator 100 and the responder 200 acquire Ti and Tr, respectively, by transmitting and receiving the request/response range packets. Subsequently, the initiator 100 makes a request for Tr and Tor by transmitting a range feedback request to the responder 200 in S280, and the responder 200 carries Tr and Tor on a range feedback response and transmits the range feedback response to the initiator 100 in S285. As described above, Tr and Tor may be transmitted at the same time or separately.

Figure 15:
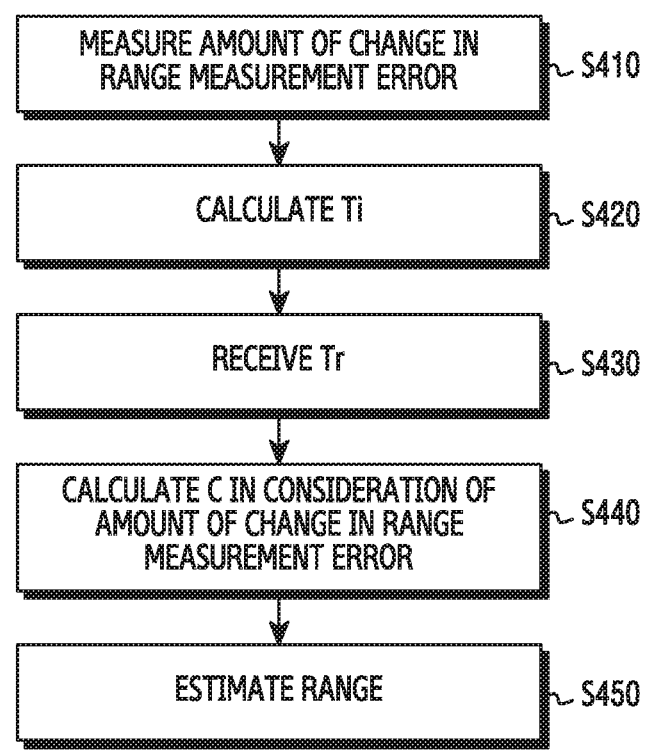
FIG. 15 illustrates a processing flow of the range measurement operation between wireless devices according to another embodiment of the present invention.
Figure 16:
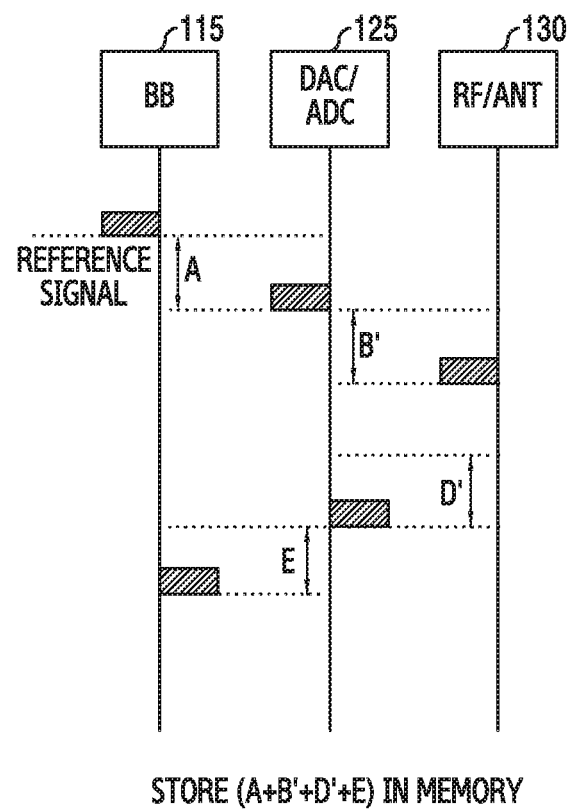
FIG. 16 illustrates an operation for measuring an amount of change in an internal circuit delay of the initiator for the range measurement operation between wireless devices according to another embodiment of the present invention.

According to an embodiment to be described in FIGS. 15 and 16, the range error calibration module 112 of the initiator 100 illustrated in FIG. 11 measures the internal circuit delay Toi of the initiator 100, that is, the range measurement error by generating and looping back a predetermined signal, for example, a single tone signal, a sinewave signal, or a signal having a correlation characteristic, and stores the measured error in a memory (not shown). Amounts of change in A and E which are expected to be changed in the reference value of the range measurement error, that is, the change in the DAC/ADC delay are detected using the stored error value and the amounts of change are calibrated the range is measured.

FIG. 15 illustrates a processing flow of the range measurement operation between wireless devices according to another embodiment of the present invention. The processing flow is performed by the range estimator 110 and the range error calibration module 112 included in the baseband processor 115 of the initiator 100. The flow illustrated in FIG. 15 merely corresponds to an example for describing the present invention and can be variously changed, and thus should not be interpreted to limit the scope of the present invention.

Referring to FIG. 15, the range error calibration module 112 of the initiator 100 transmits a reference signal and stores a returned signal corresponding to the transmitted reference signal in a memory (not shown) in step S410. At this time, a sinewave signal, a single tone signal, or a signal having a correlation characteristic may be used as the reference signal. The reference signal is looped back after sequentially passing through the DAC 125A, the RF circuit 130, and the ADC 125B as illustrated in FIG. 12A. The range error calibration module 112 calculates an amount of change in some elements in the range measurement error, for example, amounts of change in A and E by using the signal stored in the memory. Similarly, the range error compensation module of the responder 200 transmits the reference signal, stores a returned signal corresponding to the transmitted reference signal in the memory, and then calculates an amount of change in some elements in the range measurement error, for example, amounts of change in A and E. The amounts of change in A and E in the range measurement error may be calculated by the range estimator 110 instead of the range error calibration module 112.

In step S420, the range estimator 110 of the initiator 100 calculates a time Ti from a time point when a request range packet is transmitted to the responder 200 to a time point when reception of a response range packet is detected in response to the transmitted request range packet as illustrated in FIG. 8.

In step S430, the range estimator 110 of the initiator 100 receives Tr from the responder 200.

In step S440, the range estimator 110 of the initiator 100 may calculate a propagation delay C between the initiator 100 and the responder 200 in consideration of the amount of change in the range measurement error measured in step S410. When it is assumed that the reference value of the range measurement errors of the initiator 100 and the responder 200 is known, the range estimator 110 may calculate the propagation delay C in consideration of the amounts of change in A and E by adding the amounts of change in A and E to the reference value in equation (2). Further, similar to FIG. 14, the range may be measured by using the amount of change in A and E instead of Tor.

In step S450, the range estimator 110 of the initiator 100 estimates the range between the initiator 100 and the responder 200 by applying C calculated through equation (5) to equation (3).

FIG. 16 illustrates an operation for measuring an amount of change in an internal circuit delay of the initiator 100 for the range measurement operation between wireless devices according to another embodiment of the present invention. The operation illustrated in FIG. 16 merely corresponds to an example for describing the present invention and can be variously changed, and thus should not be interpreted to limit the scope of the present invention.

Referring to FIG. 16, the range error calibration module 112 of the initiator 100 transmits a reference signal and stores a returned signal corresponding to the transmitted reference signal in a memory (not shown). At this time, a sinewave signal, a single tone signal, or a signal having a correlation characteristic may be used as the reference signal. The reference signal is looped back after sequentially passing through the DAC 125A, the RF circuit 130, and the ADC 125B as illustrated in FIG. 12A. The range error calibration module 112 calculates an amount of change in some elements in the range measurement error by using the signal stored in the memory. For example, the range error calibration module 112 measures the range measurement error (A+B'+D'+E) by detecting a time point when the reference signal is looped back and returned from a time point when the reference signal is transmitted and stores the measured range measurement error in the memory. The range error calibration module 112 may calculate an amount of change in the range measurement error by comparing the previously stored range measurement error (A+B'+D'+E) and a newly stored range measurement error (A+B'+D'+E). At this time, if it is assumed that the amounts of change in B' and D' have no large difference, the amounts of change in A and E are calculated.

Similarly, the range error calibration module of the responder 200 transmits the reference signal, stores a returned signal corresponding to the transmitted reference signal in the memory, and then calculates an amount of change in some elements in the range measurement error, for example, amounts of change in A and E.

Figure 17:
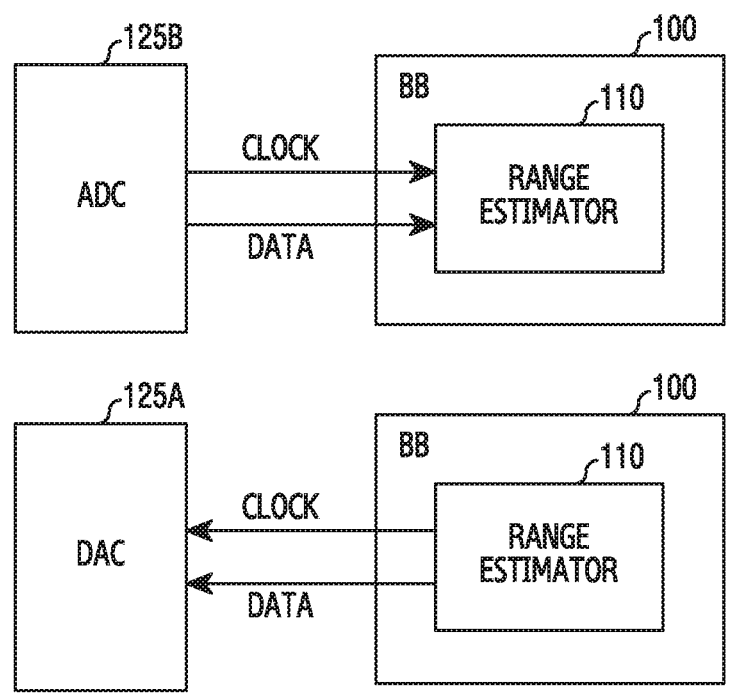
FIG. 17 illustrates a configuration of connections between a range estimator, and an analog/digital converter and a digital/analog converter for the range measurement operation between wireless devices without any error according to another embodiment of the present invention.

FIG. 17 illustrates a configuration of connections between the range estimator 110, and the ADC 125B and the DAC 125A for the range measurement operation between wireless devices without any error according to another embodiment of the present invention. The embodiment makes no change in a delay generated from the DAC 125A and the ADC 125B, thereby accurately measuring the range in spite of the range measurement based on the reference value in equation (2). The configuration illustrated in FIG. 17 merely corresponds to an example for describing the present invention and can be variously changed, and thus should not be interpreted to limit the scope of the present invention.

Referring to FIG. 17, the ADC delay may be generated in an interface between the ADC 125B and the baseband processor 100, and the DAC delay may be generated in an interface between the DAC 125A and the baseband processor 100. Such delays result from FIFO (First Input First Output) between the ADC/DAC and the baseband processor 100. Accordingly, when the range estimator 110 operates from the clock of the ADC/DAC, a change in the delay resulting from the FIFO may be removed. That is, the change in the delay of the ADC/DAC may be removed equally using the clock of the ADC/DAC and the range estimator 110.

As described above, according to embodiments of the present invention, it is possible to measure the range having the resolution of several cm through the exchange between signals through wireless devices in the wireless communication system. Further, according to embodiments of the present invention, it is possible to rapidly measure a range between wireless devices by using a request/response range packet. In addition, according to embodiments of the present invention, it is possible to provide the user with inaccuracy (reliability) of the range measurement which may be generated by an influence of a multi-path channel. Furthermore, according to embodiments of the present invention, it is possible to minimize power consumption of a range estimator by using signals used in the existing modem. Moreover, according to embodiments of the present invention, in measurement of the range between wireless devices through signals transmitted and received between the wireless devices in the wireless communication system, it is possible to accurately measure the range between the wireless devices by calibrating an internal circuit delay of the wireless device that exists as the range measurement error.

Although the present invention has been described by the restricted embodiments and the drawings as described above, the present invention is not limited to the aforementioned embodiments, and various modifications and alterations can be made from the descriptions by those skilled in the art to which the present invention pertains. For example, according to embodiments of the present invention, although it has been described that the wireless device is configured as illustrated in FIGS. 2 and 3, operates according to the flow illustrated in FIGS. 4A, 4B, 4C, and 4D, and the range estimator of the wireless device measure the range according to the flow illustrated in FIG. 14, the protection scope of the present invention is not necessarily limited thereto.

The operations according to embodiments of the present invention may be implemented by a single processor. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. An apparatus of a first wireless device for a range measurement in a wireless communication system, the apparatus comprising:
   a digital/analog converter (DAC);
   an analog/digital converter (ADC);
   a transceiver configured to:
      transmit, to a second wireless device, a request range packet,
      receive, from the second wireless device, a response range packet corresponding to the request range packet,
      transmit, to the second wireless device, a feedback request message for a second time difference from a time point when reception of the request range packet is detected by the second wireless device to a time point when the response range packet is transmitted, and
      receive, from the second wireless device, a feedback response message indicating the second time difference; and
   a baseband processor including a range estimator, the range estimator comprising an error calibrator configured to measure a reference internal circuit delay of the first wireless device, wherein the reference internal circuit delay of the first wireless device comprises a DAC delay, a transmit circuit delay, a receive circuit delay, and an ADC delay associated with a loopback of the request range packet,
   wherein the error calibrator is further configured to:
      identify an amount of change in the DAC delay and the ADC delay based on a previously stored error value, and
      calibrate the amount of change in the DAC delay and the ADC delay based on the previously stored error value and the reference internal circuit delay,
   wherein the range estimator is configured to estimate the range between the first wireless device and the second wireless device based on a first time difference from a time point when the request range packet is transmitted to a time point when reception of the response range packet is detected, the second time difference, and the reference internal circuit delay of the first wireless device, and
   wherein the range estimator, the DAC, and the ADC use a same operating clock.

2. A method of operating a first wireless device for a range measurement in a wireless communication system, the method comprising:
   transmitting, by a transceiver to a second wireless device, a request range packet;
   receiving, by the transceiver from the second wireless device, a response range packet corresponding to the request range packet;
   transmitting, by the transceiver to the second wireless device, a feedback request message for a second time difference from a time point when reception of the request range packet is detected by the second wireless device to a time point when the response range packet is transmitted;
   receiving, by the transceiver from the second wireless device, a feedback response message indicating the second time difference;
   measuring, by an error calibrator comprised in a baseband processor including a range estimator, a reference internal circuit delay of the first wireless device, wherein the reference internal circuit delay of the first wireless device comprises a DAC delay, a transmit circuit delay, a receive circuit delay, and an ADC delay associated with a loopback of the request range packet;
   identifying, by the error calibrator, an amount of change in the DAC delay and the ADC delay based on a previously stored error value;
   calibrating, by the error calibrator, the amount of change in the DAC delay and the ADC delay based on the previously stored error value and the reference internal circuit delay; and
   estimating, by the range estimator, the range between the first wireless device and the second wireless device based on a first time difference from a time point when the request range packet is transmitted to a time point when reception of the response range packet is detected, the second time difference, and the reference internal circuit delay of the first wireless device,
   wherein a same operating clock is used for the range estimator, a DAC and an ADC.

3. The method of claim 2, futher comprising measuring, by an error calibrator, a time delay of the request range packet which has returned through a loopback circuit of the first wireless device.

4. The method of claim 3, wherein the loopback circuit includes a digital/analog converter (DAC), a high frequency (RF) circuit, and an analog/digital converter (ADC).

5. The method of claim 3,
   wherein a signal propagation delay is calculated between the first wireless device and the second wireless device based on the first time difference, the second time difference, and the reference delay of the first wireless device, and
   wherein estimatation of the range between the first wireless device and the second wireless device is based on the calculated signal propagation delay.

6. The method of claim 5, wherein the the calculated signal propagation delay between the first wireless device and the second wireless device is further based on a reference delay representing an internal circuit delay of the second wireless device.

7. The method of claim 6, further comprising:
receiving information on the reference delay of the second wireless device measured by the second wireless device; and
calculating the signal propagation delay between the first wireless device and the second wireless device further based on the reference delay of the second wireless device.

8. The method of claim 3, further comprising one signal having a single tone, sinewave, and correlation characteristic.

9. The apparatus of claim 1, wherein the error calibrator measures a time delay of the request range packet which has returned through a loopback circuit of the first wireless device.

10. The apparatus of claim 9, wherein the loopback circuit includes a digital/analog converter (DAC), a high frequency (RF) circuit, and an analog/digital converter (ADC).

11. The apparatus of claim 9, wherein the range estimator calculates a signal propagation delay between the first wireless device and the second wireless device based on the first time difference, the second time difference, and the reference delay of the first wireless device and estimates the range between the first wireless device and the second wireless device based on the calculated signal propagation delay.

12. The apparatus of claim 11, wherein the range estimator calculates the signal propagation delay between the first wireless device and the second wireless device further based on a reference delay representing an internal circuit delay of the second wireless device.

13. The apparatus of claim 12, wherein the range estimator receives information on the reference delay of the second wireless device measured by the second wireless device and calculates the signal propagation delay between the first wireless device and the second wireless device further based on the reference delay of the second wireless device.

14. The apparatus of claim 9, further comprising one signal having a single tone, sinewave, and correlation characteristic.

* * * * *